Patented Aug. 15, 1933

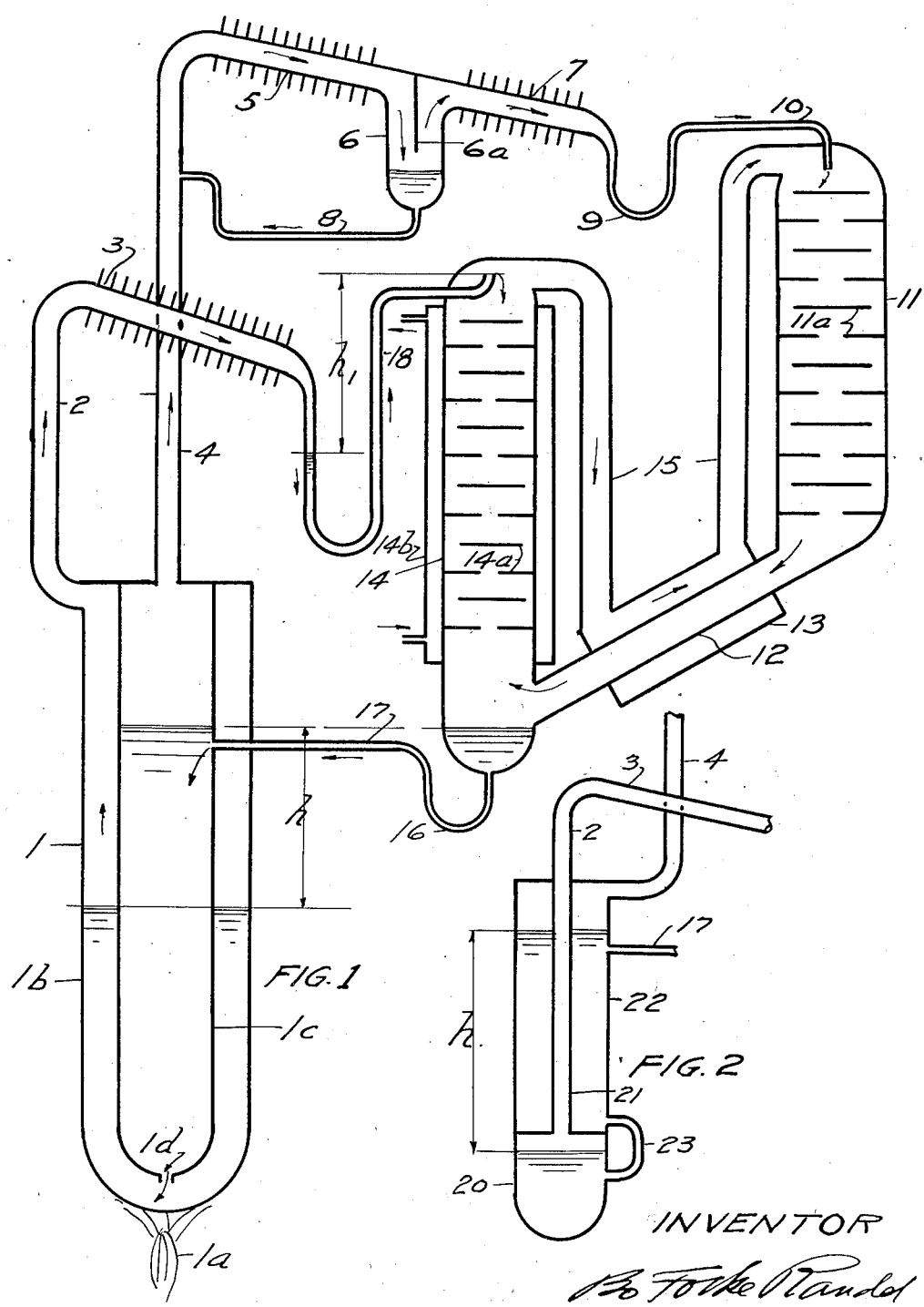

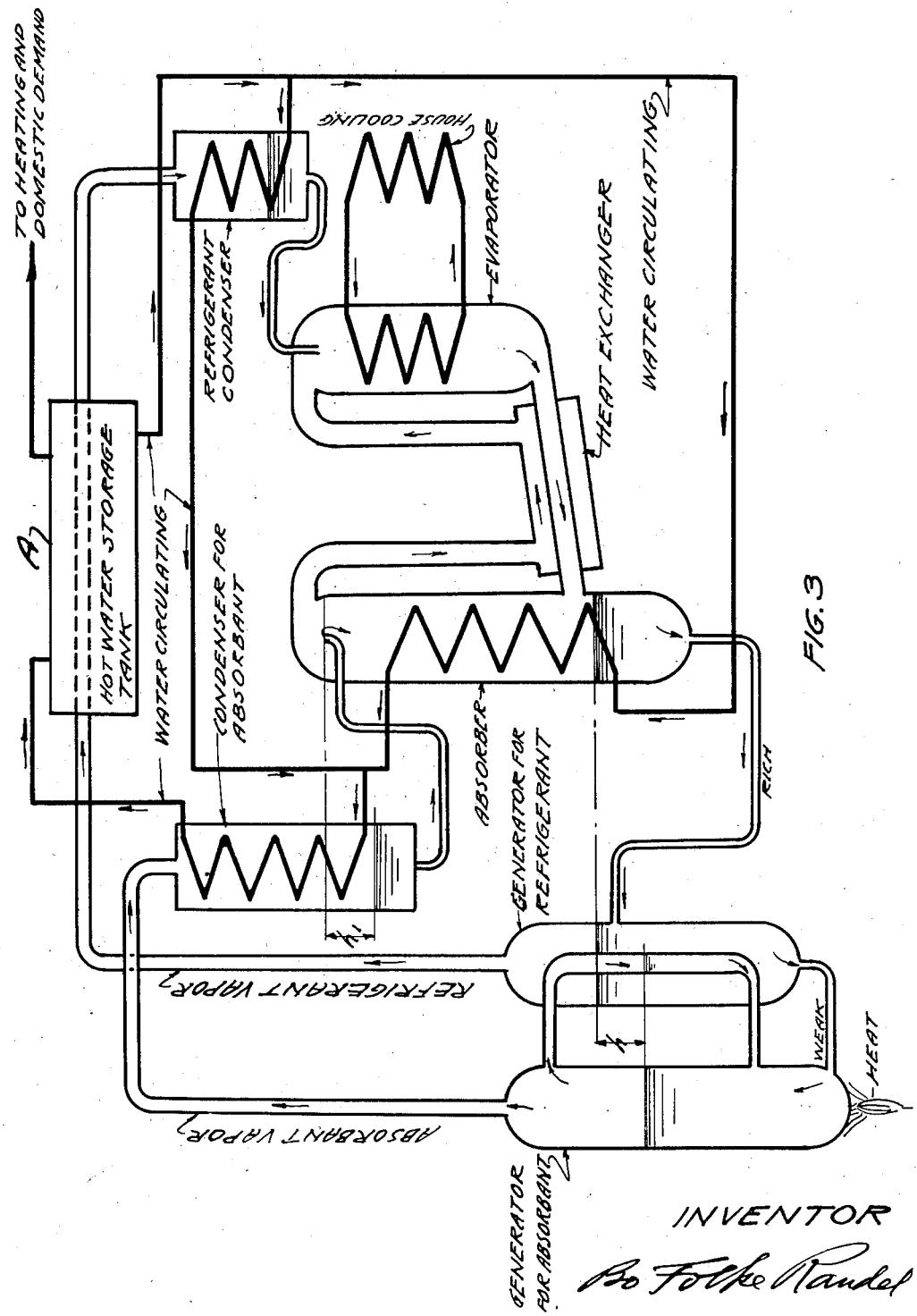

1,922,713

UNITED STATES PATENT OFFICE 1,922,713

MEANS AND METHOD OF REFRIGERATION

Bo Folke Randel, San Diego, Calif.

Application September 14, 1931
Serial No. 562,665

20 Claims. (Cl. 62—119.5)

My invention relates to the art of refrigeration, more particularly to refrigerating apparatus of the absorption type and still more particularly to refrigerating apparatus wherein circulation of the fluids used therein is accomplished entirely by forces generated within the system.

One object of the invention is to provide an improved method of circulating the refrigerant and the absorbing medium. Another object is to cause a substantial complete separation of the refrigerant and the absorbing medium in order to increase the absorbing power of the absorption medium when this medium is again brought into contact with the refrigerant. This is accomplished by first driving out the refrigerant from the absorbing medium, then vaporizing the absorbing medium and recondensing same to liquid state.

In Figure 1 I illustrate, entirely in diagrammatic form, my apparatus, and in Figure 2 I illustrate a modified form of the generator. No attention is given to details as many parts of the apparatus are entirely conventional, known in the arts and may be constructed in many different forms. In Figure 3 I illustrate an arrangement wherein the latent heat in the steam and in the ammonia is transferred to water to be used in any desired manner, for heating or for domestic purposes.

Referring to Figure 1, 1 is a generator suitable to be heated in any desired manner. A gas flame, 1a is shown, but the heat may be applied in any manner desired, and by any means suitable. The generator consists of an outer shell 1b, and an inner shell 1c. At the lower end an opening 1d is provided between the inner and outer shells. The outer shell connects by pipe 2 with a condenser 3. This condenser may be air-cooled as shown, and fitted with fins, or may be water-cooled as shown in Figure 3.

The inner shell 1b connects by pipe 4 with a rectifier 5, separator 6 and condenser 7. Rectifier 5 and condenser 7 are shown air-cooled but may be water-cooled as indicated in Figure 3.

Separator 6 with baffle plate 6a reconnects with the generator by pipe 8, solution formed passing back to this generator through pipe 4.

Condenser 7 connects through trap 9 and pipe 10 with evaporator 11, fitted with diffusion plates 11a. The lower end of this evaporator connects through pipe 12 passing through heat exchanger 13 with absorber 14 fitted with diffusion plates 14a. The upper end of the evaporator connects through pipe 15 and heat exchanger 13 with the upper end of the absorber 14. The lower end of this absorber connects through trap 16 and pipe 17 with the inner shell 1c of generator 1. The absorber is surrounded by cooling jacket 14b suitable for water cooling or may be cooled in any other suitable manner.

The operation of the apparatus is as follows: The inner shell of the generator contains a rich solution of ammonia in water, or any other refrigerant absorbed in an absorption medium may be used. In the outer shell is a very weak solution, and once the apparatus is in operation, the liquid in this outer shell will be substantially pure water or the absorption liquid only without the refrigerant. Heat is now applied to this outer shell, which heat will also be conducted through the liquid to the solution in the inner shell.

The application of heat will vaporize the water in the outer shell to steam and will drive out the ammonia from the solution in the inner shell. The steam will rise through pipe 2 to condenser 3 to be condensed to water there, while the ammonia vapor will rise in pipe 4 to rectifier 5. In this rectifier the gas will be dried by condensation of the accompanying steam, the condensate with some ammonia in solution passing back to generator through pipes 8 and 4. The separator 6 will assist in separating the solution formed from the gas, so that the ammonia entering condenser 7 is dry gas.

In this condenser the ammonia will liquefy to flow through trap 9 and pipe 10 to evaporator 11.

The condensed steam from condenser 3 will flow through pipe 18 to absorber 14. It is seen that a pressure difference $h$ will occur in generator, and that when $h_1$ equals $h$, the water will overflow into the absorber. Also, that the level of solution in the absorber will be substantially the same as the level in the inner shell 1c of the generator. Any liquid flowing into the absorber from 18 will thus later overflow back into the generator. The pressure in the absorber, the evaporator and above liquid in the inner shell 1c will be P pounds, while the pressure in the outer shell of the generator above the liquid will be P plus $h$.

The solution in the inner shell will pass downwards to enter the outer shell through opening 1A. As this solution passes downwards, it will become weaker by the driving out of the ammonia, and the apparatus is adjusted so that the liquid passing through this opening is practically pure water.

The absorber and the evaporator are filled with an inert gas, as for instance hydrogen, for equalization of the pressures. If for instance the total pressure of the system is maintained at 180 lbs. per sq. in., and the partial pressure of the hydrogen is kept at 150 lbs. per sq. in. then the liquid ammonia entering through pipe 10 will vaporize, assuming the balance or 30 lbs. pressure, thus producing refrigeration.

A mixture of hydrogen and ammonia will form in the evaporator and this mixture will flow downwards through the evaporator, pipe 12 and into the absorber. There this mixture will meet the downflowing water, which will reabsorb the ammonia, the hydrogen passing back to the evaporator as indicated by arrows.

The rich solution formed will pass back to the generator through pipe 17. The heat of absorption will be removed by cooling water in jacket 14b.

It is seen that as practically pure water enters through pipe 18, that the absorption will be efficient.

In Figure 2 I illustrate a slight modification of the generator. The lower part 20 contains the water. Heat is applied and steam rises in pipe 21 passing through shell 22, containing the solution. The solution is fed through pipe 17, being the same pipe as 17 in Figure 1, and the weakened solution or water passes from shell 22 to 20 through pipe 23. Steam passes through pipe 2 to condenser 3 as in Figure 1, and the ammonia vapor passes through pipe 4 as in Figure 1.

Figure 3 illustrates an identical apparatus to Figure 1 except the heat is passed over to water to be stored in hot water tank A, and to be used as desired. A slight modification is here made in the generator design. Part of the steam is circulated through the refrigerant section of the generator, where its latent heat is passed over to the solution vaporizing the ammonia. The balance of the steam is passed over to its condenser.

The heat in condensers and in absorber is transferred to water to be used for domestic purposes or for heating the building. The cooling produced may be applied to cooling the building by coil, as shown, or in any other suitable manner.

Rectifier may be left out when the apparatus is used for heating and cooling buildings, as in this case the temperature in the evaporator may be kept high enough not to freeze any water that may cary over from the ammonia gas generator.

Having thus described my invention, what I claim is:—

1. That process of treating a solution of a refrigerant in a liquid absorption medium of higher boiling point than the refrigerant to produce refrigeration which comprises expelling the refrigerant from the solution by the application of heat, removing the remaining absorption medium from the point of heat application, completely vaporizing the liquid absorption medium by further application of heat, condensing the vaporized absorption medium out of communication with the refrigerant, condensing the refrigerant, evaporating the liquid refrigerant in the presence of an inert fluid and in heat exchange relation with the objective of refrigeration, returning the evaporated refrigerant to the presence of the condensed absorption medium to be absorbed thereby, and returning the solution thus formed to the place of heat application.

2. Absorption refrigerating apparatus comprising, in combination, a generator for vaporizing an absorbent, a condenser for condensing said absorbent, a generator for vaporizing a refrigerant and a condenser for condensing said refrigerant, an absorber, an evaporator, means to conduct liquid from said absorbent condenser to said absorber, means to conduct liquid from said refrigerant condenser to said evaporator, means to conduct gas from said evaporator to said absorber and other means to conduct gas from said absorber to said evaporator, means to conduct liquid from said absorber to said refrigerant generator, means to conduct liquid from said refrigerant generator to said absorbent generator, means to conduct vapor of the absorption medium from said absorbent generator to said absorbent condenser and vapor of refrigerant from said refrigerant generator to said refrigerant condenser.

3. That improvement in the art of refrigerating through the agency of an absorption system including an absorbent generator, a refrigerant generator, an absorbent condenser, a refrigerant condenser, an absorber and an evaporator and containing a refrigerant and a liquid absorption medium in which the refrigerant is dissolved, which consists in separately gasifying both the refrigerant and the absorption medium in their respective generators, separately condensing the refrigerant and absorption medium in their respective condensers, and simultaneously conducting the liquefied absorption medium and liquefied refrigerant in parallel to the absorber and evaporator respectively.

4. That improvement in the art of refrigerating through the agency of an absorption system employing a refrigerant and an absorption medium therefor which consists in separately vaporizing both the refrigerant and the absorption medium in heat exchange relation with sources of heat and in separate spaces, liquefying the gaseous absorption medium, liquefying the gaseous refrigerant, evaporating the liquefied refrigerant in heat transfer relation with the objective of refrigeration and in the presence of an inert gas, introducing the mixture of evaporated refrigerant and inert gas into the presence of the liquefied absorption medium and thus absorbing the refrigerant and liberating the inert gas, returning the inert gas to the presence of the liquefied refrigerant and returning the separated absorption liquid enriched with refrigerant to the said refrigerant vaporizing space and the absorption liquid from the said refrigerant vaporizing space to the said absorbent vaporizing space.

5. Absorption refrigerating apparatus comprising, in combination, a refrigerant generator, a rectifier, a separator, a refrigerant condenser, an evaporator and, in parallel with the above, an absorbent generator, an absorbent condenser, an absorber, means to conduct liquid under influence of gravity from said rectifier and from said separator back to said refrigerant generator, further means to conduct gas from said rectifier to said refrigerant condenser through said separator, means to conduct liquid from said refrigerant condenser to said evaporator, means to conduct vapor from said absorbent generator to said absorbent condenser, means to conduct liquid under influence of gravity from said absorbent condenser to said absorber, further means to conduct gas from said evaporator to said absorber and other means to conduct gas from said absorber to said evaporator, means to conduct liquid from said absorber to said refrigerant generator and liquid from said refrigerant generator to said absorbent generator, separate means to conduct vapors from said generators to said refrigerant and absorbent condensers.

6. Absorption refrigerating apparatus comprising, in combination, a refrigerant generator, a refrigerant condenser, an evaporator, and, in parallel with the above, an absorbent generator, absorbent condenser, an absorber and containing refrigerant fluid, absorption liquid and an auxiliary gas, means to conduct liquid from said refrigerant condenser to said evaporator, means to conduct liquid from said absorbent condenser to said absorber, conduits connecting said evaporator and absorber, and arranged to permit circulation of said auxiliary gas between the evaporator and absorber, due to force produced within the apparatus, means to conduct liquid from the said absorber to the said refrigerant generator, means to conduct liquid from said refrigerant generator to said absorbent generator and separate means to conduct vapors from said generators to said respective condensers.

7. That process of treating a solution of a refrigerant in a liquid absorption medium of higher boiling point than the refrigerant to produce refrigeration which comprises expelling the refrigerant from solution in heat exchange relation with a source of heat, vaporizing the liquid absorption medium out of communication with the refrigerant also in heat exchange relation with a source of heat, condensing the absorption medium, condensing the refrigerant, evaporating the liquid refrigerant in heat exchange relation with the objective of refrigeration and in the presence of an auxiliary gas, circulating the auxiliary gas into the presence of the condensed absorption medium and back to the presence of the liquefied refrigerant to transfer the evaporated refrigerant to the presence of the absorption medium to be absorbed thereby, returning the solution thus formed to heat exchange relation with said first source of heat, and removing said absorption medium out of communication with said refrigerant.

8. That improvement in the art of refrigerating through the agency of an absorption system including a refrigerant generator, an absorbent generator, an absorber and an evaporator and containing a refrigerant and a liquid absorption medium in which the refrigerant is dissolved which consists in separately gasifying both the refrigerant and the absorption medium in their respective generators, separately condensing the refrigerant and absorption medium, simultaneously conducting the liquefied absorption medium and liquefied refrigerant in parallel to the absorber and evaporator respectively, generating circulating force within the system, circulating an auxiliary gas through the evaporator and absorber due to said force and conducting enriched absorption medium from the absorber to the refrigerant generator and absorption medium from the refrigerant generator to the absorbent generator under the influence of gravity.

9. Absorption refrigerating apparatus comprising, in combination, a generator, a rectifier, a refrigerant condenser, an evaporator and, in parallel with the above, said generator, an absorbent condenser, an absorber, means forming said generator into a strong liquor chamber and an interconnected weak liquor chamber, means to apply heat to the weak liquor chamber and means to conduct heat from said weak liquor chamber to said strong liquor chamber, means to conduct a vapor from said strong liquor chamber to said rectifier, means to conduct vapor from said weak liquor chamber to said absorbent condenser, means to conduct liquid from said rectifier back to said generator and vapor to said refrigerant condenser, means to conduct liquid from said refrigerant condenser to said evaporator and from said absorbent condenser to said absorber, means between said absorber and said evaporator to conduct vapors from one to the other, and means to conduct liquid from said absorber to said generator.

10. Absorption refrigerating apparatus comprising, in combination, two interconnected generators, one for absorbent and one for refrigerant, an absorber, an evaporator, an absorbent condenser situated above said absorbent generator and above said absorber, a refrigerant condenser situated above said refrigerant generator and above said evaporator, means to conduct vapors of an absorption medium from said absorbent generator to said absorbent condenser, and means to conduct liquid from said absorbent condenser to said absorber, means to conduct vapor of a refrigerant from said refrigerant generator to said refrigerant condenser and liquid from said refrigerant condenser to said evaporator, means to conduct gas from the said evaporator to the said absorber, and other means to conduct gas from said absorber to said evaporator, and means to conduct liquid from said absorber to said refrigerant generator, and further means to conduct liquid between said two generators.

11. A method of refrigeration comprising evaporating a refrigerant from an absorption solution by heat application leaving a weakened absorption solution, condensing the refrigerant, vaporizing the condensed refrigerant in the presence of an inert fluid; removing the weak absorption solution from the point of heat application and completely vaporizing the weak solution by further application of heat, condensing the vaporized solution out of communication with the refrigerant; conducting the condensed solution and the vaporized refrigerant in the presence of an inert fluid into contact with each other, absorbing the vaporized refrigerant by the condensed solution and conducting the resulting strong solution to the original point of heat application.

12. A method of refrigeration comprising evaporating a refrigerating medium in solution with an absorption medium and a part of said absorption medium by heat application, condensing the said vaporized absorption medium and absorbing the said refrigerant vapor forming a super-strong solution, vaporizing the refrigerant out of the said super-strong solution in the presence of an inert fluid; removing the remaining liquid absorption medium from the point of heat application and completely vaporizing same by further application of heat, condensing the then vaporized absorption medium out of communication with the refrigerant; conducting the condensed absorption medium and the vaporized refrigerant in the presence of an inert fluid into contact with each other, absorbing the vaporized refrigerant by the condensed absorption medium and conducting the resulting strong solution to the original point of heat application.

13. That improvement in the art of refrigeration through the agency of an absorption system employing a refrigerant, an absorbent and a pressure equalizing fluid which consists in boiling the absorbent by heat application, utilizing part of the vapor generated to heat a solution of the refrigerant in the absorbent to vaporize the refrigerant out of said solution and condensing the absorbent vapor and returning the condensate to first point of heat application.

14. In an absorption refrigerating apparatus employing an absorbent, a refrigerant and an inert gas, a boiler for absorbent, a generator for refrigerant, heating means in said generator, means to conduct a vapor from said boiler to said heating means and means to conduct condensate from said heating means back to said boiler.

15. In an absorption type of refrigerating apparatus employing an absorbent, a refrigerant and an inert pressure equalizing medium, a boiler for absorbent and heating means in connection with said boiler, and a generator for refrigerant enclosed inside said boiler.

16. In an absorption type of refrigerating apparatus employing an absorbent, a refrigerant and an inert pressure equalizing fluid, a boiler for absorbent and a refrigerant generator, a vapor channel leading from said boiler, said vapor channel being situated in such a position as to permit the heat of absorbent vapor to pass over to and evaporate the refrigerant from a solution in said absorbent in said refrigerant generator.

17. That improvement in the art of refrigeration through the agency of an absorption system employing a refrigerant, an absorbent and a pressure equalizing fluid circulating between an evaporator and an absorber which consists in boiling the absorbent by heat application, utilizing part of the vapor generated to heat a solution of the refrigerant in the absorbent to vaporize the refrigerant out of said solution and condensing the absorbent vapor and returning the condensate to first point of heat application.

18. In an absorption refrigerating apparatus employing an absorbent, a refrigerant and an inert gas circulating between an evaporator and an absorber, a boiler for absorbent, a generator for refrigerant, heating means in said generator, means to conduct a vapor from said boiler to said heating means and means to conduct condensate from said heating means back to said boiler.

19. In an absorption type of refrigerating apparatus employing an absorbent, a refrigerant and an inert pressure equalizing medium in an evaporator and an absorber, a boiler for absorbent and heating means in connection with said boiler, and a generator for refrigerant enclosed inside said boiler.

20. In an absorption type of refrigerating apparatus employing an absorbent, a refrigerant and an inert pressure equalizing fluid in an evaporator and an absorber, a boiler for absorbent, and a refrigerant generator, a vapor channel leading from said boiler, said vapor channel being situated in such a position as to permit the heat of absorbent vapor to pass over to and evaporate the refrigerant from a solution in said absorbent in said refrigerant generator.

BO FOLKE RANDEL.